(12) United States Patent
Williams

(10) Patent No.: US 7,280,918 B2
(45) Date of Patent: Oct. 9, 2007

(54) METHOD AND SYSTEM FOR COMBINING SEISMIC DATA AND BASIN MODELING

(75) Inventor: Kenneth E. Williams, Sugarland, TX (US)

(73) Assignee: Knowledge Systems, Inc., Sugar Land, TX (US)

( * ) Notice: Subject to any disclaimer, the term of this patent is extended or adjusted under 35 U.S.C. 154(b) by 35 days.

(21) Appl. No.: 11/198,989

(22) Filed: Aug. 8, 2005

(65) Prior Publication Data

US 2007/0032955 A1    Feb. 8, 2007

(51) Int. Cl.
*G01V 1/28* (2006.01)
(52) U.S. Cl. ............................................. 702/14; 702/6
(58) Field of Classification Search .................. 702/12, 702/13, 14, 16, 18, 6; 703/10; 367/73
See application file for complete search history.

(56) References Cited

U.S. PATENT DOCUMENTS

| 5,081,612 | A  * | 1/1992  | Scott et al. .................... | 367/38 |
| 6,430,507 | B1   | 8/2002  | Jorgensen et al. | |
| 6,751,558 | B2 * | 6/2004  | Huffman et al. ............... | 702/14 |
| 6,980,940 | B1 * | 12/2005 | Gurpinar et al. .............. | 703/10 |

OTHER PUBLICATIONS

Dutta, et al.; "*Estimation of Formation Fluid Pressure Using High-Resolution Velocity from Inversion of Seismic Data and a Rock Physics Model Based on Compaction and Burial Diagenesis of Shales;*" The Leading Edge; Dec. 2006; pp. 1528-1539.

Chopra, et al.; "*Velocity Determination for Pore-Pressure Prediction;*" The LEading Edge; Dec. 2006; pp. 1502-1514.

Ebrom, et al.; "*Subsalt Pressure Prediction from Multicomponent Seismics (and More! );*" The Leading Edge; Dec. 2006; pp. 1540-1542.

Madatov, et al.; "MSTU_5: *The Effective Basin Model Concept and Combine Overpressure Modeling in Basin Time Scale;* " Journal of the Murmansk State Technical Institue, Murmansk, Russia, (No Date).

Madatov; "MSTU_6: *The Overpressure Driven Seismic Velocity Response. Review of Standard Models and Methods for Extraction in Context of Basin Modelling Approach to Overpressure Prediction;*" Journal of the Murmansk State Technical, Institute, Murmansk, Russia, (No Date).

(Continued)

*Primary Examiner*—Donald McElheny, Jr.
(74) *Attorney, Agent, or Firm*—Wong, Cabello, Lutsch, Rutherford & Brucculeri, LLP

(57) ABSTRACT

Methods and computer-based systems are provided for processing seismic data through the use of information provided by basin modeling. Provided are methods and systems for providing an improved seismic dataset by means of providing an initial basin model constructed using an initially-available dataset including seismic velocity data; constructing a velocity dataset from the initial basin model; and reprocessing the initially available seismic data using the velocity dataset from the initial basin model as a guide. Also provided are methods and systems for predicting fluid pressure in a subsurface region of interest.

23 Claims, 11 Drawing Sheets

OTHER PUBLICATIONS

Yilmaz; "*Seismic Data Analysis: Processing, Inversion, and Interpretation of Seismic Data;*" vol. I & II; Society of Exploration Geophysicists, Investigation in Geophysics No. 10, 2001, 2027p.; pp. 1-23, 25-157, 271-461, 1353-1524, and 1961-2000.

Barker; "*Developments in Petroleum Science, 45: Thermal Modeling of Petroleum Generation Theory and Applications;*" pp. v-xiii, 67-82, 83-138, 275-299, and 301-326.

Düppenbecker, et al.; "*Basin Modelling: Practice and Progress;*" Geological Society Special Publication No. 141; The Geological Society, london 1998; pp. 1-14, 15-43, 45-72, 73-81, 83-94, 95-107, 109-116, 187-208, and 209-221.

Lerche; "*Basin Analysis: Quantitive Methods;*" vol. 1; Academic Press, Inc.; 1990; pp. 1-11, 12-47, 73-131, 208-243, and 480-493.

Lerche; "*Basin Analysis: Quantitive Methods;*" vol. 2; Academic Press, Inc.; 1990; pp. 502-533.

Wendebourg, et al.; "*Simulating Oil Entrapment in Clastic Sequences;*" Computer Methods in the Geosciences; 1997; pp. 1-9, 27-58, 59-81, 82-98, 99-114, 115-144, and 161-168.

Chilingar, et al.; "*Developments in Petroleum Science50: Origin and Prediction of Abnormal Formation Pressures;* " 2002 Elsevier Science B.V.; pp. 1-19, 21-67, 169-190, and 311-351.

Huffman, et al.; "*Pressure Regimes in Sedimentary Basins and Their Prediction;* " AAPG Memoir 76; Houston Chapter of the American Association of Drilling Engineers Houston, TX, Sep. 2-4, 1998; pp. 1-12, 21-32, 165-169, 117-215, and 217-233.

Law, et al.; "*Abnormal Pressures in Hydrocarbon Environments;* " AAPG Memoir 70; AAPG Hedberg Research Conference, Golden, CO, Jun. 8-10, 1994; The American Association of Petroleum Geologists; pp.1-11, 13-34, 35-63, and 87-104.

Hearst, et al.; "*Well Logging for Physical Properties: A Handbook for Geophysicists, Geologists, and Engineers;* " 2000 John Wiley & Sons Ltd.; pp. 3-11, 12-18, and 19-35.

Isaaks, et al.; "*Applied Geostatisics;*" Oxford University Press 1989; 3-9, 525-537, and 538-541.

\* cited by examiner

Figure 5: Construct a Basin Model: Basic Workflow

Input Data  5a

- Geological Horizon Structure (See Figure 6)
- (For Expansion, see Figure 7)
- Geologic Ages (Unit Thicknesses)
- Lithology of each overall Modeled unit
- Paleowater Depths
- Temperature (SWI and Geoth. Grad)
- Definitive Porosity at Calibration Pts
- Definitive Pore pressure at Cal Pts Calibration and Testing (See Figure 9)  5b

- Adjust Internal Model Parameters by Inverse modeling
- Simplify the model and Adjust the parameters by hand-tuning

- Verify the model's accuracy by blind-testing

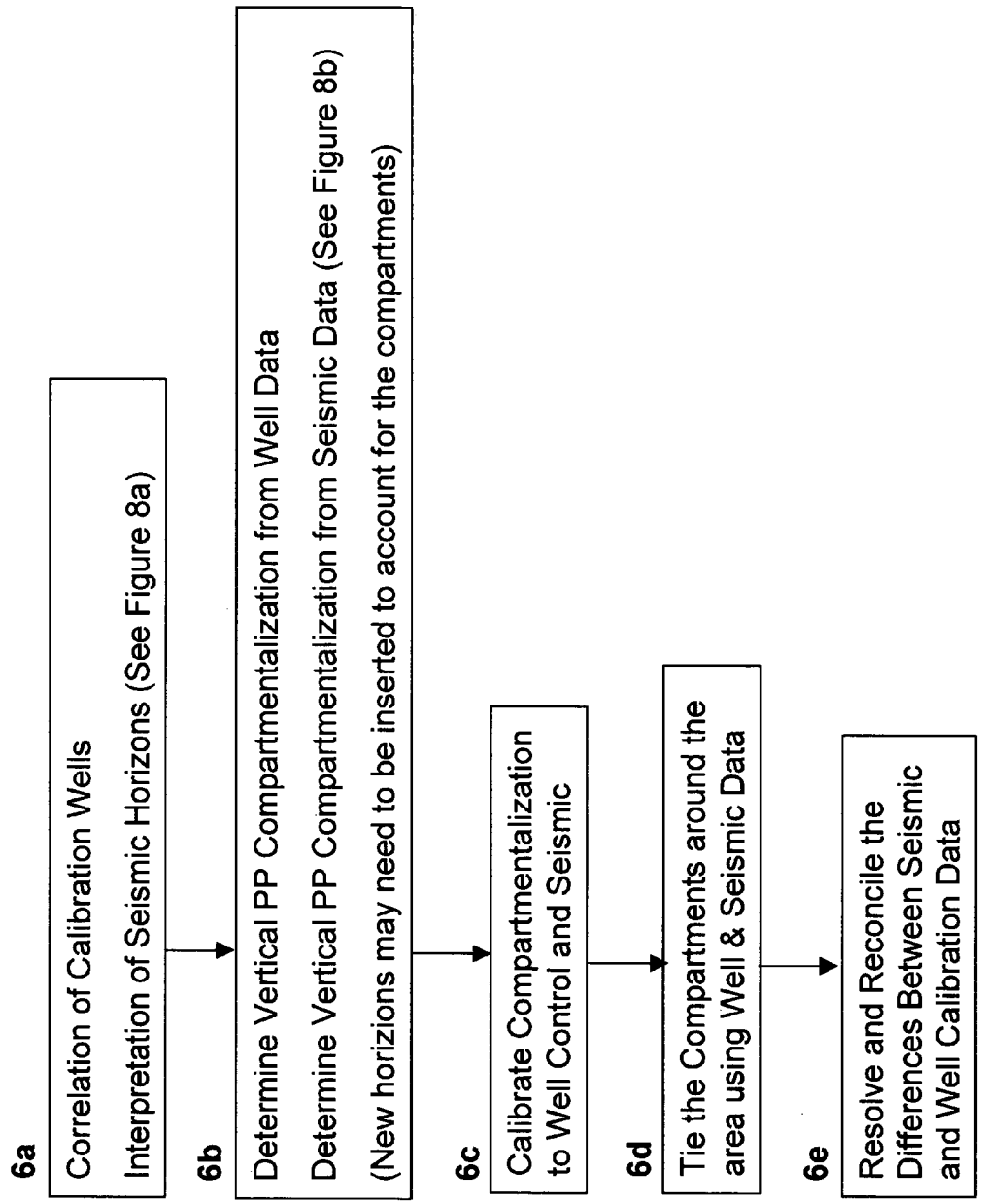

Figure 7: Basin Model Input Data (Continued)

Petrophysical Analysis of Log Data  7a

Lithology of each overall Modeled unit
Temperature (SWI and Geoth. Grad)

Biostratigraphic Data  7c

Geologic Ages (Sedimentation Rates)
Paleowater Depths

Definitive Porosity at Calibration Pts  7b

Analysis of Porosity Logs for
Overall Interval Shale Porosity

Definitive Pore Pressure at Calibration Pts  7d

Petrophysical Analysis of Shale Pressure Indicators
Overburden analysis (Sediment Density Analysis)
Effective Stress and Velocity Relationships
Well Drilling Data Analysis (Gas, Cuttings, Kicks, Stuck Pipe, etc)
Direct Pressure Test Data (MDT, RFT, Etc.)
Reconciliation of Differences (Lithology and Centroid Effects, etc.)
Best Overall Interpretation of the True PP Figure 8: Basin Model Input Data. Seismic 8a: Input Data: Geologic Horizon Structure Interpretation of Seismic Horizons 8b: Analysis of Seismic Data for Pore pressure Velocity-Effective Stress Relationships Calibrated to Well Control
  Incorporate Aerial Variations in OBG and Vel-Eff.Stress
  Incorporate Vertical Changes in OBG (due to Salt, for Example) and Vel-Eff.Stress Relationships Determine Vertical and Horizontal PP Compartmentalization
  (New horizons or faults may need to be inserted in the model to account for the compartments)

8c: Use Selected Velocities to input Pseudowells into the Basin Model

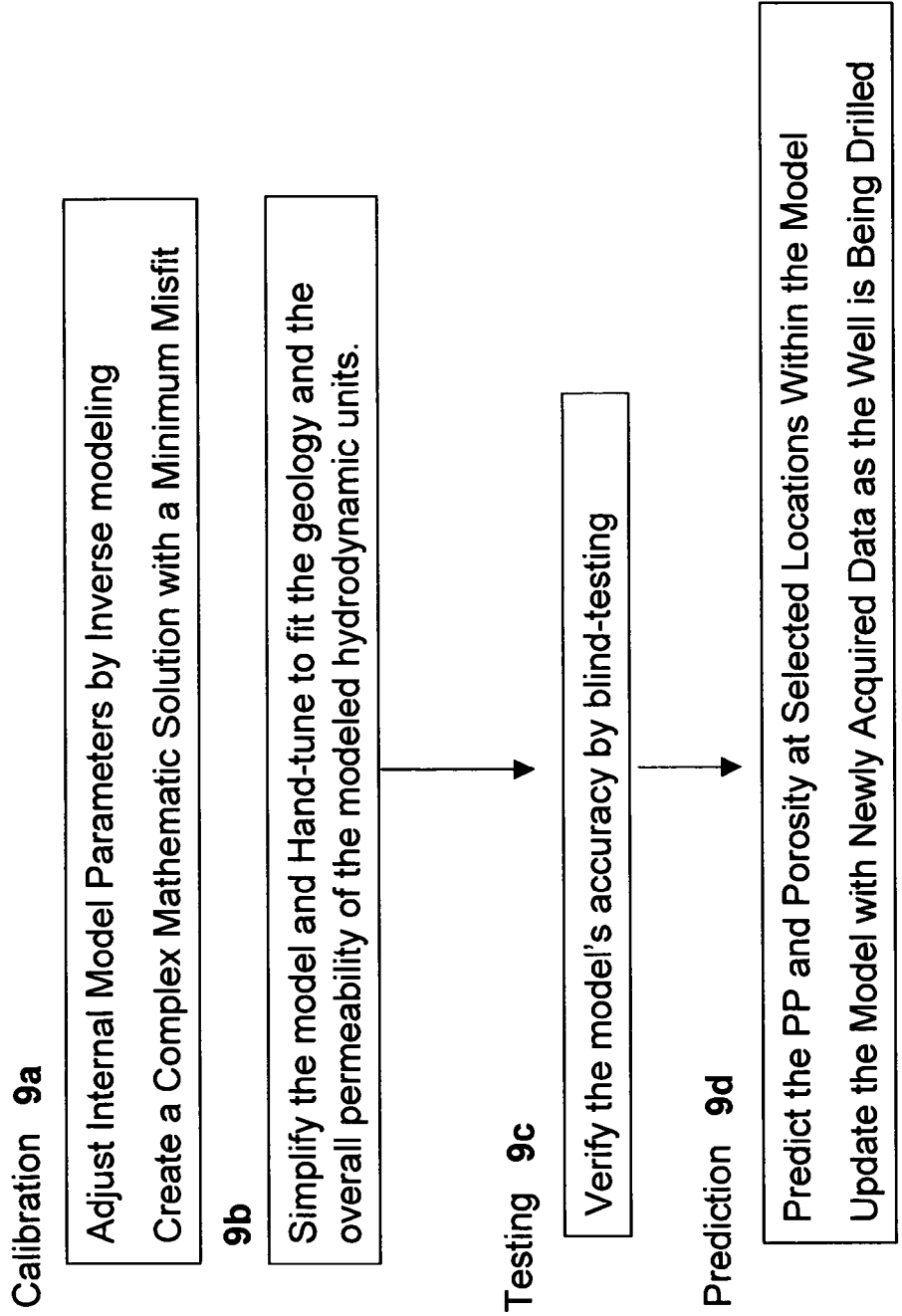
Figure 9: Basin Model Calibration and Testing

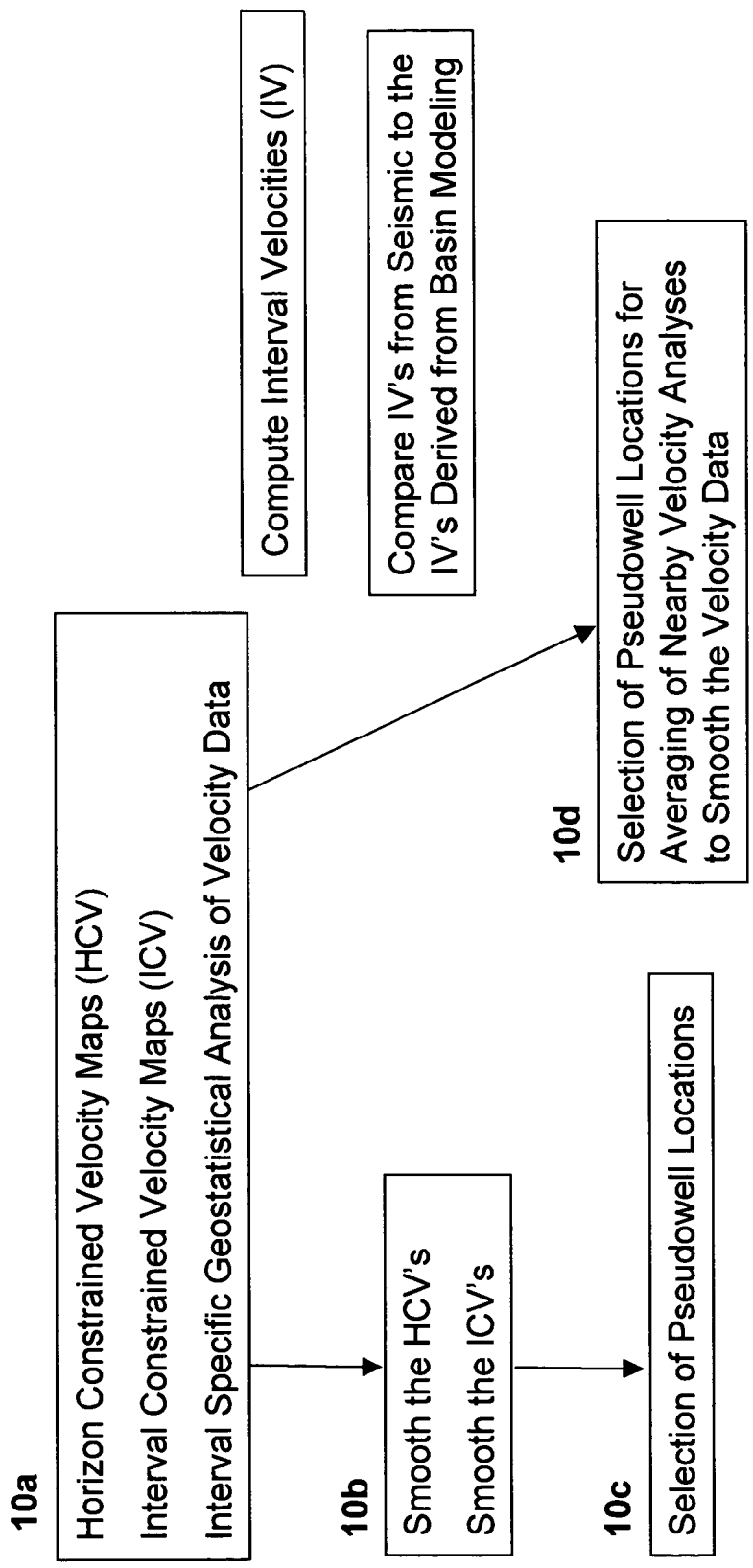
Figure 10: Examination of the Seismic Velocity Data: Identify a Sparse Subset of the Entire Seismic Velocity Dataset for Use in Calibrating the Basin Model

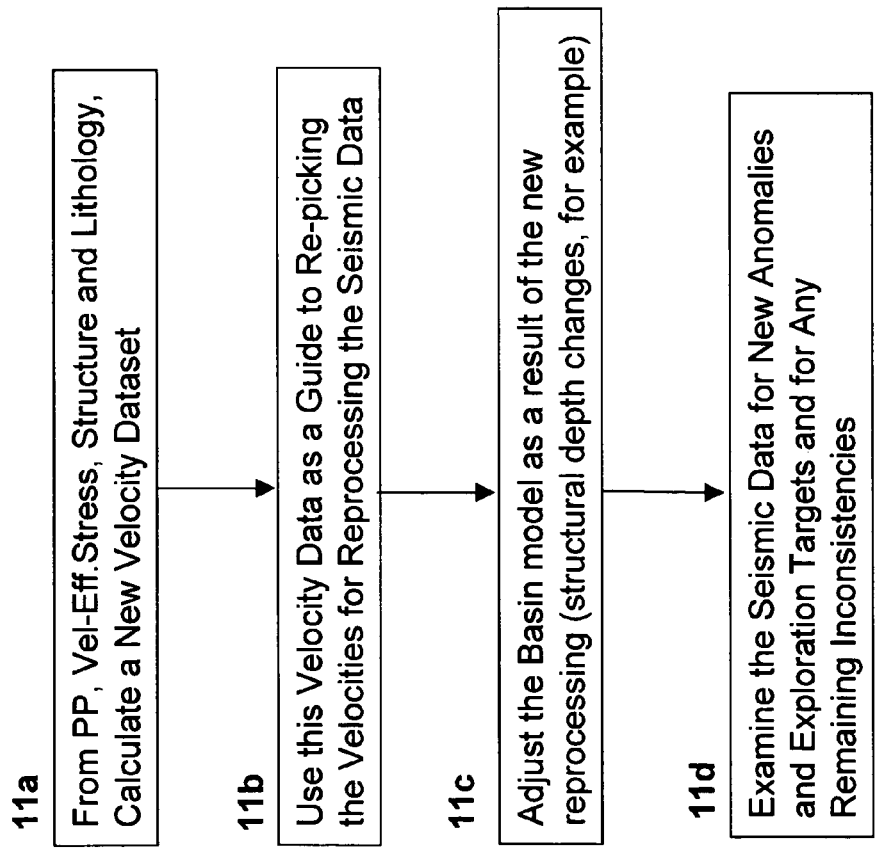
Figure 11: Use the Velocity Data from the Basin Model to Improve the Seismic Image

METHOD AND SYSTEM FOR COMBINING SEISMIC DATA AND BASIN MODELING

BACKGROUND OF THE INVENTION

The present invention concerns methods and systems for processing seismic data and basin modeling. A correct interpretation of the velocity field within the Earth is necessary to properly image seismic data at its true location and depth in the subsurface. This velocity field can be estimated by a number of methods, the most important and common being the analysis of stacking, or the roughly equivalent Normal Moveout ("NMO"), velocities on Common Midpoint ("CMP") gathers. A number of other techniques are also used, including the use of multiple constant-velocity stacks of a small interval of the seismic line, signal coherency analysis of the velocity spectrum, horizon-consistent velocity analysis, the application of statics and residual statics corrections, migration velocity analysis and tomographic inversion techniques. In the absence of well data, these techniques rely on information that is contained within the seismic dataset itself for all of the input data, the parameters for determining the velocity field, its consistency and validity. Seismic processing is a robust process that can tolerate errors of up to approximately 10% and still yield a reasonable image. Once well control data is obtained, more realistic values of the true velocity field are available and the new velocities can be used to refine the seismic image. For proper depth imaging of structural anomalies, and for lithologic and stratigraphic identification and detailing, a much lower tolerance for velocity errors is acceptable, generally less than 1%. Structural depths from both well control and seismic data are commonly used as one of the input sources for basin models.

Basin models are simplifications of the earth and its processes with the intent being to track the dynamic evolution of one or more of those processes through time. For example, the processes related to the generation and migration of hydrocarbons is commonly modeled with the intent to determine which of several possible structural culminations may be the most prospective for containing a commercial accumulation. Basin models use data from seismic, well control and knowledge of the geology of the area to construct a numerical model of the region and to track the changes in the various modeled parameters through time to reach a set of predictions that are then calibrated to the known information at the present. The model parameters are then adjusted within geologically reasonable bounds until a successful match and calibration is reached. Prediction can then be made at locations away from the calibration points.

Basin models and seismic processing are traditionally done quite independently of each other by experts that have completely different skill sets and knowledge bases. Nonetheless, there are several areas where the two can be used together for the mutual improvement of each. In the presence of overpressures, seismic velocities are lower than would normally be expected at that depth, amplitudes are suppressed and the presence of multiple pressure compartments and ramps makes the interpretation of velocities from seismic alone difficult. Below salt masses, high velocity high reflectivity interfaces and below rugose surfaces, the Earth filter removes significant amounts of the signal that again makes the analysis of velocities from seismic data alone difficult. Below about 15,000' (different depths in different basins), the seismic velocities are high and the frequency content of the recorded signal becomes lower, again making the velocity analysis of the data from seismic alone difficult. Basin modeling can provide information on geologically reasonable values for those velocities. A method and process to accomplish this objective is described herein.

SUMMARY OF THE INVENTION

The present invention relates to methods and computer-related systems for processing seismic data through the use of information provided by basin modeling. More specifically, the present invention relates to methods for deriving an improved velocity field for the reprocessing seismic data through the analysis of some of the results derived from basin modeling. Thus, one aspect of the present invention relates to methods of providing an improved seismic dataset comprising the steps of providing an initial basin model, whereby the initial basin model is constructed using an initially-available dataset including at least some initially available seismic velocity data, and using a selected subset of the initially available seismic velocity data as calibration inputs; constructing a velocity dataset from the initial basin model; and reprocessing the initially available seismic data using the velocity dataset from the initial basin model as a guide.

Additional iterations of this method may be used to further improve the basic model. Another aspect of the present invention relates to computer-based systems for providing an improved seismic dataset comprising means for providing an initial basin model, means for constructing a velocity dataset using the initial basin model, means for identifying a selected subset of velocity data from the velocity dataset, means for using the selected subset of the velocity data to reprocess the seismic data, and optionally, means for revising the initial basin model using the reprocessed seismic data. Still another aspect of the present invention relates to methods of providing an improved seismic dataset comprising the steps of providing an initial basin model, constructing a velocity dataset using the initial basin model, using the velocity dataset to reprocess the seismic data, and then revising the initial basin model using the reprocessed seismic data. Another aspect of the present invention relates to methods of determining fluid pressure in a subsurface region of interest, comprising providing an initial basin model constructed using initially-available seismic data, constructing a velocity dataset using the initial basin model, identifying a selected subset of velocity data from the velocity dataset, using the selected subset of the velocity data to reprocess the seismic data, revising the initial basin model using the reprocessed seismic data, and determining the fluid pressure in the subsurface region of interest using the revised basin model. Further still, another aspect of the present invention relates to computer-based systems for employing the above-referenced method of determining fluid pressure in a subsurface region.

BRIEF DESCRIPTION OF THE DRAWINGS

FIG. 5 shows a process of basin model construction.

FIG. 6 shows basin model input data related to geologic horizon structure.

FIG. 7 shows basin model input data related to calibration.

FIG. 8 shows basin model input data related to seismic.

FIG. 9 shows basin model calibration and testing processes.

FIG. 10 shows the examination of the seismic velocity data to provide a sparse subset of the entire velocity dataset for use in calibrating the basin model.

FIG. 11 shows the use of the velocity data from the basin model to improve the seismic image.

DESCRIPTION OF ILLUSTRATIVE EMBODIMENTS

Figure 1:
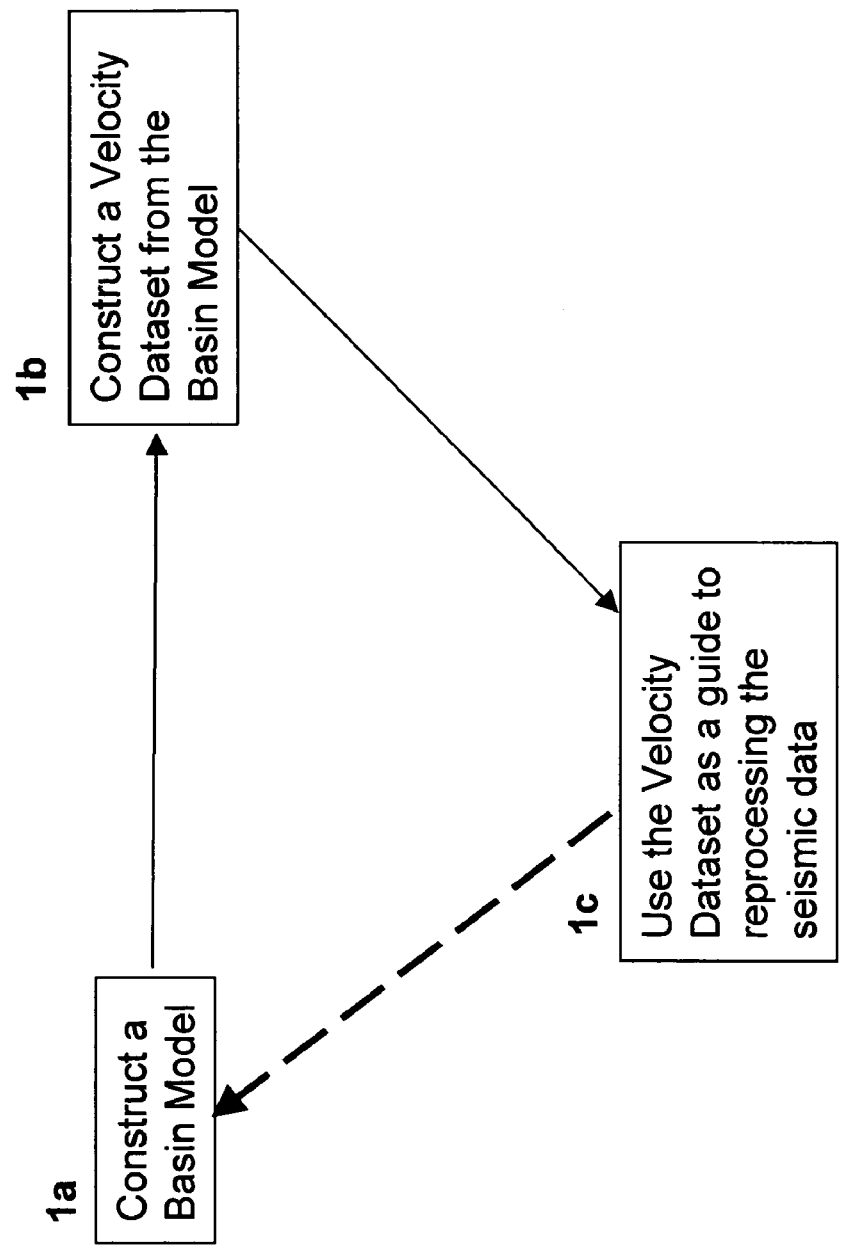
FIG. 1 shows the basic steps embodied in one aspect of the present invention.

FIG. 1 represents a simple embodiment of the current invention and is comprised of the following steps: (1*a*) construction of an initial basin model using at least some seismic data, (1*b*) construction of a velocity dataset from the basin model, and (1*c*) use of this velocity cube as a guide to re-picking the velocities that will be used for reprocessing the seismic data. Typically, at least some seismic data will be available for constructing the initial basin model. Preferably, the initial basin model is constructed from all initially available seismic and other input and calibration data. Most preferably, at least some of the initially available data is well control data. The initial basin model is preferably constructed using known methods and calibrated to all the known geologic, seismic and well data in the modeled area. The basin model is then used to construct a velocity volume. This velocity volume that can then be used as a guide to re-picking the initially solely seismic-based NMO velocities on CMP gathers for restacking the seismic data. The new velocities will change the interpreted depths away from those that were initially interpreted and that were used in the initial construction of the basin model. Therefore, the initial basin model may need to be adjusted to reflect the new depths.

Figure 2:
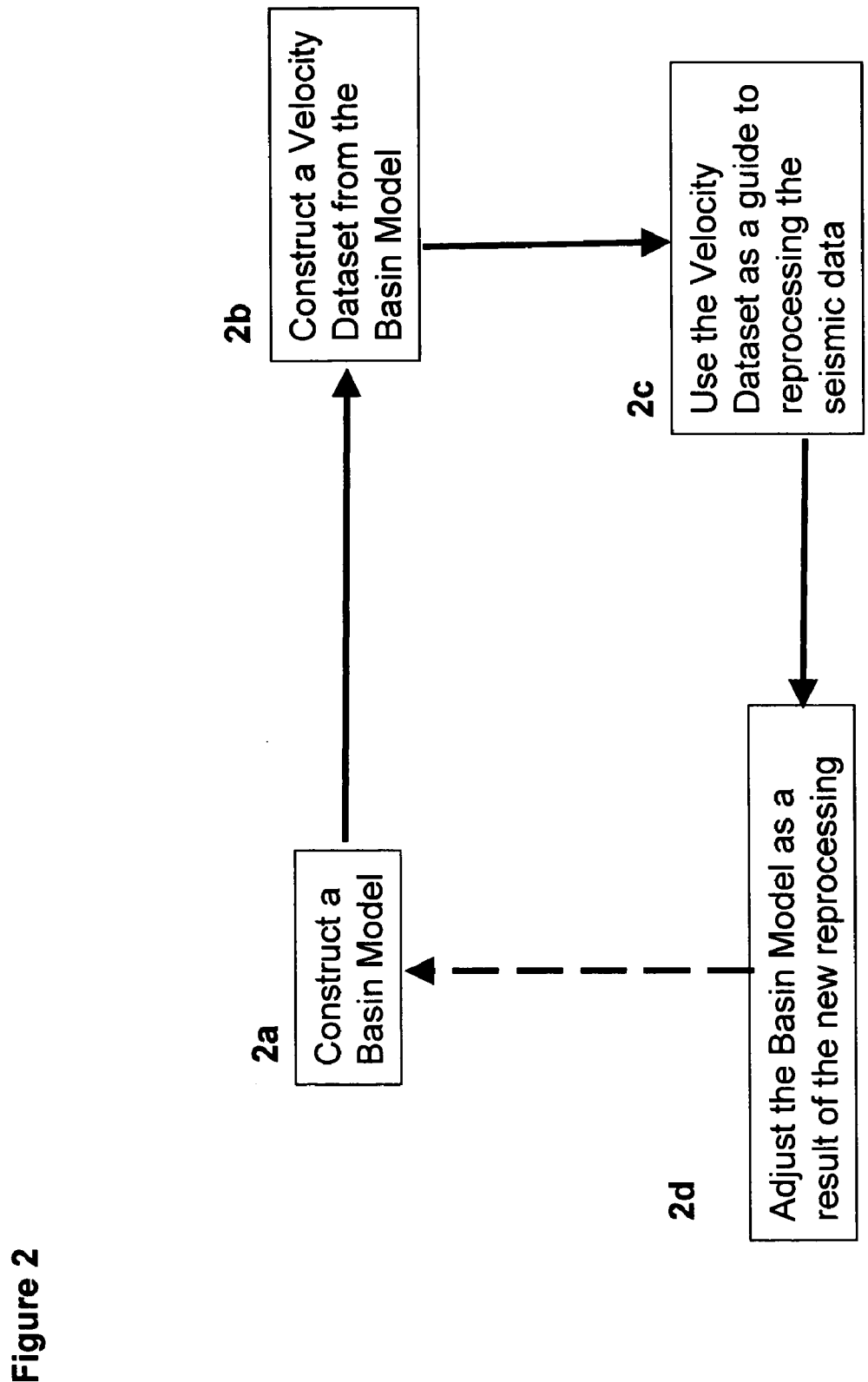
FIG. 2 shows the iteration of the embodied process as a result of reprocessing the seismic data.

FIG. 2 is composed of the same steps as FIG. 1, with the addition of the iterative step of adjusting the basin model as a result of the new seismic reprocessing. This step is indicated, because every change in the interpreted velocities above any horizon of interest will result in a change in the interpreted depth to that horizon.

Figure 3:
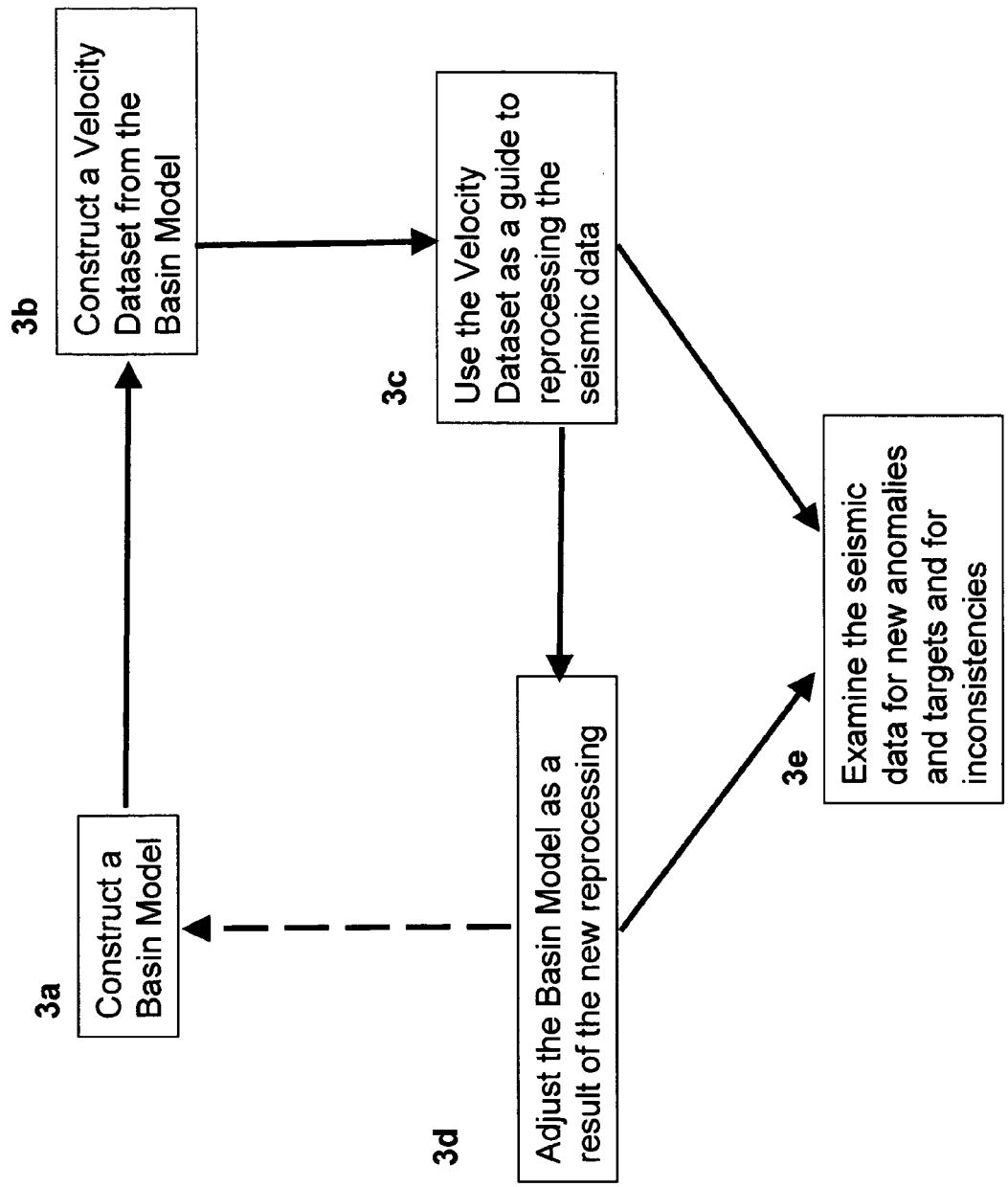
FIG. 3 shows the use of improved seismic and basin modeling to examine the seismic data for new anomalies.

FIG. 3 shows the utility of one aspect of the present invention. After the seismic data has been improved using the velocity dataset as a guide, the seismic data can then be examined for any new anomalies and potential targets for hydrocarbon exploration, as well as for any inconsistencies that have arisen between the various input datasets.

Figure 4:
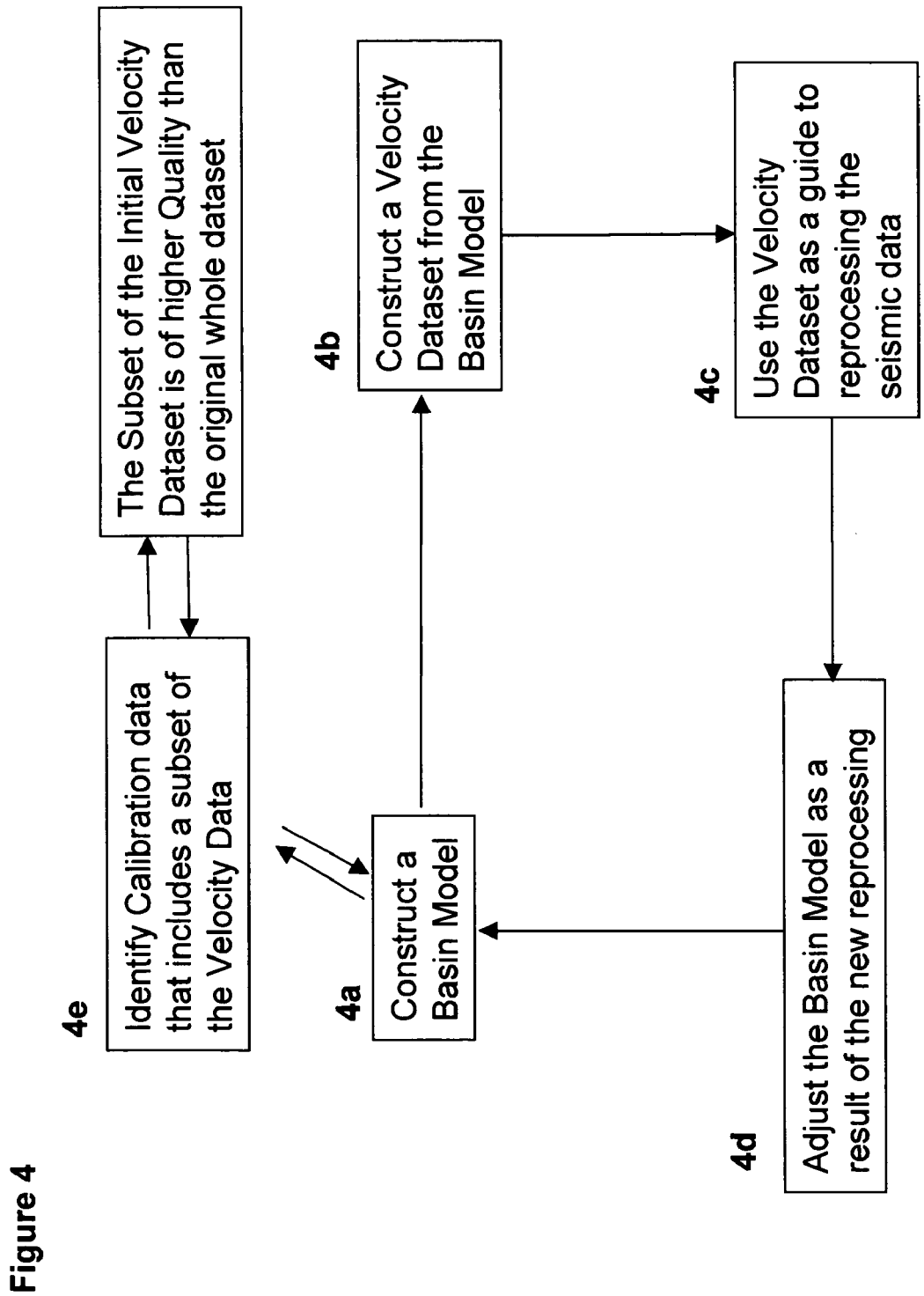
FIG. 4 shows the step in the process where a subset of the initial velocity dataset is identified for basin model calibration.

FIG. 4 is similar to FIG. 3 but with the depiction of the sub-step during the construction of the basin model, of identifying calibration data that includes a subset of the initial velocity data (4*e*). This calibration data is preferably everywhere geologically reasonable and internally consistent, and should preferably be of higher quality than the original whole dataset.

The main object of processing seismic data is to obtain an accurate representation of the subsurface of the Earth with the maximum image resolution while retaining the proper amplitudes and character of the signal. The primary emphasis is on producing the best image. An uncertainty exists in many cases as to what is the correct velocity to use to produce that image, especially in the absence of good well control data for calibration of the seismically derived velocities and the actual velocities obtained from the well data such as sonic or vertical seismic profile (VSP) information. In addition, the quality and reliability of the seismic derived velocities is degraded with increasing depth by the properties of the Earth filter.

Basin modeling uses seismic data as one source of input and adds more detailed analysis of the well calibration data and information from the known or inferred geology of the area. The resulting model therefore extends the interpretation derived from seismic alone and allows the projection of geologically reasonable parameters into areas where the seismic image may be poor. In those areas (below salt masses, or in the deeper section below 15,000' for example), the geologic model can provide an improved range of reasonable limits for the velocity field than can be obtained from analysis of the seismic data alone. This improved velocity can then either be used directly as input to reprocessing or it can be used as a guide to the re-picking of the velocities that can be used in the reprocessing. An improved seismic dataset can therefore be obtained that should be of greater accuracy in both depth and imaging. An improved image that is based on velocities that are closer to the true Earth velocities will allow for the examination of the data for new prospects, both structurally and stratigraphically.

Various aspects of the present invention will now be explained in greater detail.

I. Initial Basin Model.

As is well understood to one of skill in the art, a basin model is constructed from data that comes from a number of different sources. These include seismic, well control, temperature and temperature gradient data, biostratigraphic control and several others. FIG. 5 shows the basic workflow that is generally followed when creating a basin model. There are two main areas of work, acquiring and preparing the input data (5*a*), and the calibration and testing of the model (5*b*). For the first part of building a basin model, the input data must be assembled. Geological horizon structure is generally required, as is a general knowledge of the ages and lithology of the units that are included in the model. The temperature of the units at various depths is preferably also known, and the paleowaterdepths may be also used to get a better model of the development of the sediments through time. The calibration data, definitive porosity and pore pressure is preferably also analyzed at the points that will be used to calibrate the model parameters. Depending on the purpose of the basin model, a number of other input data may need to be analyzed and prepared for input into the model. These may include geochemical data on the source rock type, richness and quality and other information such as apatite fission track analysis or the analysis of the vitrinite reflectance of the samples within the modeled area from well data.

The basin model is then built and calibrated to the known data as it exists at the present time by, for example, adjusting the internal model parameters either by multiple forward modeling or by inverse modeling followed by forward modeling of the derived parameters (5*b*). The model is then optionally and preferably simplified and re-run until a successful calibration is reached wherein the model parameters can be interpolated or extracted to make a prediction of the conditions at a proposed location or area. The model is typically tested for its predictive accuracy by a process of blind-testing (5*b*).

Most basin models that are in use today are mainly oriented towards the analysis of hydrocarbons, their generation, migration and the prediction of the volumes that may be potentially recoverable. There are some models that are mainly oriented towards the reconstruction of the structural configuration of an area through time. There are others that are more oriented towards the specific application of determining the pressure environment in the subsurface. Some attempt to incorporate all these various functions into one package. A large number of basin models have been created as tools for researchers and geologists to analyze the conditions within the Earth through time. Some of the ones that remain in common use are Basin Mod® from Platte River Associates, Inc., USA; TemisPack™, GENEX™ and Temis 3D™ from IFP, France; RIFT®, BASEVAL® and KINETICS® from ICU, Norway; SeisStrat™, PetroGen™, PetroFlow™ and PetroMod™ from IES, Germany; and Drillworks Expert™ from KSI, USA. In most of these programs, the definitive data (such as porosity and pore pressure) to which the correlations must be made are derived from some external source and are supplied to the program as input data to which the model parameters will be adjusted in the calibration step. The Drillworks Expert™ program is preferred because it currently supplies all the tools necessary for the analysis of the overpressure environment from well control and seismic data and the associated basin modeling algorithms. It will therefore be used as a guide for the description of the methods and processes that are outlined herein. However, the other above programs could be also used for the calibration of the data and the construction of a subsurface depiction of the pore pressure environment. Therefore, these other programs could also be used to practice the methods and processes of the present invention. Some additions and modifications to those individual programs could be needed to be made to construct a velocity model based on a pressure regime that could be used in the analysis described herein. Such additions and modifications, of course, would be well with the expertise of one of ordinary skill in the art.

Preparation of a basin model may comprise the following steps, starting with the assembly and preparation of the input data. (These steps are shown in FIGS. 6 and 7 for primarily well-based data and in FIG. 8 for primarily seismic-based data). First, the basic geological structure of the area to be modeled is determined. This step includes the correlation of offset well data that will be used in the subsequent calibration of the model (6a). Simultaneously, the interpretation of structure of a number of seismic horizons from the best available seismic dataset is done (8a). The seismic horizons are correlated to the well control data and an estimate of the ages of the various surfaces is made.

The initially defined surfaces are unlikely to coincide with the actual pressure compartment boundaries that exist in the Earth, therefore the actual condition of that vertical pressure compartmentalization should be determined from offset or nearby well data and it should also be determined by the analysis of the initial velocity data from seismic (6b). A number of conventional methods are available for the analysis of the pressure compartments, most being based on some empirical relationship between the velocity of the rock and the effective stress at that depth. Effective stress is defined as the difference between the overburden stress and the pore pressure. When plotted in the appropriate units, this relationship commonly results in a straight-line correlation over some significant portion of the dataset and therefore provides the basic transform that is used in the conversion of one to the other. The newly identified pressure compartment boundary horizons should also be mapped across the area and included in the basin model as unit boundaries (6d).

Any changes (vertical and horizontal) in either the overburden gradient ("OBG") and/or the velocity to effective stress relationships should be included in the basin model, constructing new surfaces where necessary (See FIGS. 6b and 8b). Any discontinuities in the pressure compartments should be identified and included in the model as in the case where a fault separates two compartments of different pressure. Selected pseudowells can be included in the model, based on the velocity data that is available for any improvement in the model resolution that may be needed. Therefore all identifiable pressure compartments should be included in the modeling through the proper selection of both vertical compartment boundaries (mapped or modeled horizons) and laterally by the inclusion of appropriate faulting (FIG. 6). The compartments and their boundaries should preferably be tied around the area of the model using both the well and seismic data. Of course, any differences between the well control and the seismic data should be resolved and reconciled (6e).

The initial basin model may also incorporate other information, as shown in FIG. 7. The petrophysical analysis of well log data and the record of the lithologies that were penetrated (mud logs) can be used to identify the various lithologies that should be included in the model (7a). Likewise, the temperature data from the well control can be used to determine the upper boundary condition (temperature at the sediment-water interface) and the geothermal gradient (7a). The petrophysical analysis can be used to determine the definitive porosity for the various lithologies that will be included in the model (7b). Biostratigraphic data or formation determinations can be used to assign the proper geologic ages for the various units in the model (7c). That same biostratigraphic data can be used to determine the paleowaterdepths for the deposition of each unit (7c).

The basic steps required for the identification of the definitive pore pressure that will be used in the basin model are highlighted in FIG. 7. The petrophysical examination of pore pressure indicators in the primarily shale portions of the model provides the basis for the overall pressure data that is used for calibration in the model. Shales are the most responsive lithology to pressure with resistivity, velocity, density and neutron logs showing a response to pressure changes. Using the well data, other indicators such as background and connection gas readings, cuttings, kicks, stuck pipe and such can also be used as pressure indicators. Also, the direct pressure test information, RFT or MDT tests for example, can be used to calibrate the petrophysical analysis to more closely approach a true indicator of the pore pressure conditions in the Earth. A true representation of the overburden stress is also required for most of the pressure analysis techniques. This may be obtained from analysis of the density data either directly or indirectly with the gaps in the data being filled in by geologically reasonable values. The various estimations of pressure from the different methods will almost always be in some degree of conflict with each other, since each petrophysical measurement is responding to its own unique set of parameters, conditions and calibration. Therefore, a definitive pore pressure curve may be hand-drawn to include the results and comparison of all the available data, not merely the sonic or VSP data alone, as is often done in purely geophysical pore pressure analysis methods. Furthermore, since the operation of the program that is being described herein preferably requires the use of a sparse set of pseudowells as data input, the step of analyzing and smoothing the initial seismic velocity dataset is preferred. Every point in the grid cannot and should not be input into the program. This step will be described separately below under the heading of 'Examining the Velocity Data'.

Moving to FIG. 9, once the initial input data for the basin model has been assembled, the model is calibrated initially by an inverse modeling procedure to provide a starting set of parameters that can be used in forward modeling to model the pore pressures and porosity at the present time and to examine their changes through the geologic time that is being modeled. This creates a very complex, but mathematically and numerically acceptable, solution that has a minimum misfit between the modeled values and the definitive datasets (9a). The model is then simplified to a numerically oversimplified set of parameters that has a less good misfit. The modeled parameters at the calibration points are then hand-tuned to achieve both a good misfit and a relatively simple variation of the parameters that is then capable of being interpolated for values of those parameters and the resulting pressure and porosity prediction at intermediate locations in the model (9b). The model is then tested for predictive accuracy by a process of blind testing whereby each calibration well in the model is sequentially removed, predicted by interpolation and the predicted and actual compared as a validity check. At this point, if a satisfactory calibration and testing has been achieved, predictions can be made at any point within the model to the presumed accuracy established by the blind testing procedure (9d). Furthermore, the model can be updated with new information as the predicted well is being drilled.

II. Examining the Velocity Data.

The seismic velocity dataset consists normally of a set of velocity analysis points where the NMO velocities have been identified from the CMP gathers. It is typically desired to identify the velocity function that flattens the gathers so that when the seismic data is stacked, the signal is enhanced and the noise is reduced, thereby enhancing the overall quality of the resulting seismic image. The ability to identify the accurate NMO velocity from CMP gathers is highly dependent on the quality of the data that is recorded. In areas of good data, this method is entirely sufficient to provide good velocities for the stacking and depth conversion of the data; subject of course to the inevitable modifications when well data becomes available and the velocity field can be adjusted. The quality of the velocity analysis does vary across the area of the survey due mainly to differences in the structural complexity and to the varying effects of the Earth filter. Several techniques for the analysis of this velocity field can be used to identify areas of better data quality and those of poorer data.

For the purposes of basin modeling, a sparse subset of the entire velocity dataset is identified and used in calibrating the model (4e). FIG. 10 elucidates some of the various techniques that may be used to accomplish this objective. Commonly in constructing a depth image of the subsurface, horizon constrained velocity ("HCV") analysis is performed by applying coherency algorithms to the structural horizons that are used in the imaging process (10a). Similarly residual moveout analysis allows the adjustment of the velocity field to obtain a better image. For the purposes of basin modeling, interval constrained velocity maps ("ICV") can be produced that show the variations in the velocity gradient within an interval defined by previously mapped upper and lower surfaces (10a). Geostatistical analysis techniques can then be applied to the ICV volumes to indicate internal changes in the trends of the velocity field within the interval (10a). Changes within these datasets may result from changes in the lithology of the units or it can be from some other cause such as the degradation of the quality of the velocity field as a result of the Erath filter. Areas of better quality data can be distinguished from areas where the velocity field is of lower quality. Smoothing of the HCV and ICV data can be done to remove the effects of inconsistencies that were introduced by changes in the quality of the CMP gathers across the area and the inability to consistently identify the true velocity function in areas of poor data quality (10b). Selection of the location of pseudowell for model calibration can be obtained as a result of this analysis (10c). Alternatively or additionally, the selection of pseudowells can be made from examination of the HCV, ICV and geostatistical analyses. A group of velocity analyses in proximity to the selected pseudowells can then be averaged to produce a smoothed velocity profile for use in calibrating the basin model (10d).

Normally, the velocity of buried rocks tends to increase with depth due to the increasing stress of the overburden. In areas of overpressured rocks, this trend is not followed since the velocity of any given lithologic composition is dependent on a number of factors including the shape of the pore spaces within that rock, the temperature, the content of the pore filling fluid or gas, the confining pressure, and the pore pressure of the fluid within the pore space. The pore pressure is one of the more significant of these factors and its changes from one pressure compartment to another is therefore one of the main causes of velocity variations with the Earth. The relationship between velocity and effective stress (related to both the confining pressure and the pore pressure) is commonly nearly linear over a large part of the recorded values. Pressure modeling and compartment analysis is therefore a powerful method that can be used to analyze the velocity variations within a rock volume.

III. Constructing a Velocity Dataset

The velocity analysis that is completed for the purpose of stacking the seismic data, forms an initial velocity datacube in the case of 3D seismic or an initial velocity dataset in the case of 2D seismic. A selected subset of this velocity data is identified for use in constructing and calibrating a basin model (4e). The basin model is then calibrated, validated and blind tested (4a).

When an acceptable basin model is obtained from this analysis, the basin model can then be queried one or more points for the value of the rock properties, especially lithology, porosity, permeability, overburden gradient and pore pressure, among others. This data can then be converted to velocity using the same model-wide constant, or smoothly varying, velocity to effective stress linear relationship that was used to convert the velocities into pressure data for the initial model calibration. This then forms the velocity dataset that is derived from the basin model (4b). The velocity dataset was initially based on a sparse subset of the entire seismic velocity data, selected for quality, smoothness, geological reasonableness and consistency. The velocity dataset was then modified by the process and procedures of basin modeling and was tested for its internal validity in blind testing. This subset of the initial velocity dataset as modified by the basin modeling is now of higher quality than the original whole seismic dataset and can therefore be used in the next step of the analysis method and process described herein.

IV. Reprocessing the Seismic Data.

Velocity data extracted from the basin modeling as described herein can be extracted and used as a guide (for example, as an overlay or simple display of the velocity function as a curve) when reexamining the initially available seismic CMP gathers for the purpose of identifying the proper NMO function to be used in the standard procedures involved in the reprocessing of seismic data (FIG. 11b). In areas of poor quality seismic data, there may be only infrequent and weak signals available for the definition of this NMO function. In these cases, a standard mode of increasing velocities with depth is often applied, yielding a stacked section that may be less than optimal in the cases where velocities do not in fact increase with increasing depth. NMO velocities are therefore not uncommonly picked at or above the high end of the possible range of velocities for an area. The use of a geologically reasonable value for the velocity function acts as a guide to the improved selection of the proper function to use that incorporates all the known and calibrated information in the area and allows the selection and use of a velocity function for stacking that is closer to the true value present in the area. The result of this method and process is an improved image of the subsurface that is closer to the true condition in the subsurface. This is especially useful in areas of highly variable velocities and in areas of poor velocity data as in, for example, below salt masses where distortion of the velocity field is not uncommon.

Velocity data as improved by the process described above can be used in the standard seismic processing procedure of migrating the seismic data.

V. Revising the Initial Basin Model.

As shown in FIG. 11, the use of a different velocity function in reprocessed seismic data necessarily results in a different depthing of the various imaged horizons. Therefore, the depths that were used in the original basin model now are in need of readjustment to coincide with the new input data. This adjustment may either be significant or not, depending on the amount of change in the velocity field that was applied to the seismic data as a result of this method. Nonetheless, the effects of the changes should be identified and accounted for by a reiteration of the basin modeling process with the main changes being in the adjustments of the depths of the various horizons that are incorporated into the model (11c).

The seismic data itself will now have an improved image and therefore should be reexamined for any newly identified anomalies and exploration targets that may now be imaged in the data (11d). Also, any remaining inconsistencies in the various datasets and analyses may need to be reexamined for the possibility of reconciliation.

The following references, to the extent that they provide exemplary procedural or other details supplementary to those set forth herein, are specifically incorporated herein by reference.

Barker, Colin, 1996, Thermal Modeling of Petroleum Generation: Theory and Applications, Elseveir, Amsterdam, 512p.

Chilingar, C. V., V. A. Serebryakov, and J. O. Robertson, Jr., 2002, Origin and Prediction of Abnormal Formation Pressures, Developments in Petroleum Geoscience No. 50, Elsevier, Amsterdam, 373p.

Duppenbecker, S. J. and J. E. Illiffe, 1998, Basin Modeling: Practice and Progress, Geological Society Special Publication No. 141, Geological Society of London, 245p.

Hearst, Joseph R., Philip H. Nelson and Frederick L. Paillet, 2000, Well Logging for Physical Properties: A Handbook for Geophysicists, Geologists and Engineers, John Wiley & Sons, Ltd., New York, 483p.

Huffman, A, and G. Bowers, 2002, Pressure Regimes in Sedimentary Basins and their Prediction, American Association of Petroleum Geologists, Memoir 76, 238p.

Isaaks, Edward H. and R Mohan Srivastava, 1989, An Introduction to Applied Geostatistics, Oxford University press, New York, 561p.

Law, B. E., G. F. Ulmishek, and V. I. Slavin, 1998, Abnormal Pressures in Hydrocarbon Environments, American Association of Petroleum Geologists, Memoir 70, 264p.

Lerche, Ian, 1990a, Basin Analysis: Quantitative Methods, Volume 1, Academic Press, Inc., San Diego, Calif., 562p.

Lerche, Ian, 1990b, Basin Analysis: Quantitative Methods, Volume 2, Academic Press, Inc., San Diego, Calif., 570p.

Wendenbourg, Johannes and John W. Harbaugh, 1997, Simulating Oil entrapments in Clastic Sequences, Computer Methods in the Geosciences, Vol. 16, Pergamon, Elsevier, New York, 199p.

Yilmaz, Oz, 2001, Seismic Data Analysis: Processing, Inversion, and Interpretation of Seismic Data, Volume I and II, Society of Exploration Geophysicists, Investigations in Geophysics No. 10, 2027p.

While the invention has been described with respect to preferred embodiments, it will be apparent to those skilled in the art that various modifications and improvements may be made without departing from the scope and spirit of the invention. Accordingly, it is to be understood that the invention is not to be limited by the aforementioned specific illustrative embodiments, but only by the scope of the appended claims.

What is claimed is:

1. A method of providing an improved seismic dataset comprising:
    (a) providing an initial basin model constructed using an initially-available dataset comprising at least some initially available seismic velocity data,
        and using a selected subset of the initially available seismic velocity data as calibration inputs to the initial basin model;
    (b) constructing a velocity dataset from the initial basin model; and
    (c) reprocessing the initially available seismic data using the velocity dataset from the initial basin model as a guide, to form the improved seismic dataset.

2. The method of claim 1, further comprising:
    (d) revising the initial basin model using the improved seismic dataset.

3. The method of claim 2, further comprising:
    (e) providing a third basin model constructed using the improved seismic dataset, and using a selected subset of the velocity data used to build the improved seismic dataset as calibration inputs to the third basin model;
    (f) constructing a velocity dataset from the revised basin model; and
    (g) reprocessing the improved seismic dataset using the velocity dataset from the revised basin model as a guide, to form a further improved seismic dataset.

4. The method of claim 1, further comprising using the improved seismic dataset to identify and locate anomalies in the subsurface.

5. The method of claim 3, further comprising using the further improved seismic dataset to identify and locate anomalies in the subsurface.

6. The method of claim 1, wherein the initially-available dataset comprises at least some well control data.

7. The method of claim 6, wherein the well control data comprises at least one type of data selected from the group consisting of sp log data, gamma ray log data, resistivity log data, sonic log data and density neutron log data.

8. The method of claim 1, wherein the step of reprocessing the initially available seismic data is performed via standard industry methodologies.

9. The method of claim 1, wherein the initial basin model is calibrated by:
(a) identifying a region having satisfactory velocity data;
(b) using the satisfactory velocity data to estimate corresponding pore pressures within the identified region;
(c) using the estimated corresponding pore pressures within the identified region to calibrate the basin model.

10. The method of claim 9, wherein the estimated corresponding pore pressures are input into the basin model as pseudowells.

11. The method of claim 6, wherein the basin model is calibrated using available well control data.

12. The method of claim 1, further comprising using the improved velocity dataset for migrating the initially available seismic velocity data and improved seismic dataset.

13. The method of claim 1, wherein the velocity dataset is a velocity datacube.

14. A computer-based system for providing an improved seismic dataset comprising:
(a) means for providing a calibrated initial basin model using initially-available data including at least some initially-available seismic data;
(b) means for constructing a velocity dataset using the initial basin model;
(c) means for reprocessing the initially-available seismic data using the velocity dataset as a guide, thereby forming the improved seismic dataset.

15. The computer-based system of claim 14, further comprising:
(d) means for revising the initial basin model using the improved seismic dataset.

16. The computer-based system of claim 15, further comprising:
(e) means for providing a third basin model using the improved seismic dataset and a selected subset of the velocity data used to build the improved seismic dataset;
(f) means for constructing a velocity dataset from the revised basin model;
(g) means for reprocessing the improved seismic dataset using the velocity dataset from the revised basin model as a guide, to form a further improved seismic dataset.

17. A method of predicting fluid pressure in a subsurface region of interest comprising:
(a) providing an initial basin model constructed using an initially-available dataset comprising at least some initially available seismic velocity data,
and using a selected subset of the initially available seismic velocity data as calibration inputs to the initial basin model;
(b) constructing a velocity dataset from the initial basin model;
(c) reprocessing the initially available seismic data using the velocity dataset from the initial basin model as a guide, to form the improved seismic dataset;
(d) revising the initial basin model using the improved seismic dataset; and
(e) determining the fluid pressure in the subsurface region of interest using the revised basin model.

18. The method of claim 17, wherein the initially-available dataset comprises at least some well control data.

19. The method of claim 18, wherein the well control data comprises at least one type of data selected from the group consisting of sp log data, gamma ray log data, resistivity log data, sonic log data and density neutron log data.

20. The method of claim 17, wherein the step of reprocessing the initially available seismic data is performed via standard industry methodologies.

21. The method of claim 17, wherein the initial basin model is calibrated by:
(a) identifying a region having satisfactory velocity data;
(b) using the satisfactory velocity data to estimate corresponding pore pressures within the identified region;
(c) using the estimated corresponding pore pressures within the identified region to calibrate the basin model.

22. The method of claim 21, wherein the estimated corresponding pore pressures are input into the basin model as pseudowells.

23. The method of claim 17, wherein the basin model is calibrated using available well control data.

* * * * *